United States Patent [19]
Vincent et al.

[11] 3,796,887
[45] Mar. 12, 1974

[54] PHOTOMETRIC ANALYZER

[75] Inventors: Arthur Leonard Vincent, Monrovia;
Lawrence Eugene Wysocki,
Glendora; Herman B. Abrams,
Manhattan Beach, all of Calif.

[73] Assignee: International Telephone and Telegraph Corporation, New York, N.Y.

[22] Filed: May 17, 1972

[21] Appl. No.: 254,098

[52] U.S. Cl. ................. 250/565, 250/372, 356/207
[51] Int. Cl. ........................................ G01n 21/26
[58] Field of Search ............... 250/43.5 R, 86, 218; 356/207, 208, 246

[56] References Cited
UNITED STATES PATENTS

| 3,564,272 | 2/1971 | Payton et al. | 250/218 |
| 3,628,028 | 12/1971 | Thorsheim | 250/218 |
| 3,562,522 | 2/1971 | Cederstrand | 250/43.5 |
| 3,563,661 | 2/1971 | Charlson et al. | 250/218 X |
| 3,551,678 | 12/1970 | Mitchell | 250/43.5 X |
| 2,720,594 | 10/1955 | Hutchins | 250/43.5 |
| 3,588,496 | 6/1971 | Snowman | 250/43.5 |
| 2,866,899 | 12/1958 | Busignies | 250/43.5 |
| 3,600,590 | 8/1971 | Einstein | 250/218 |

FOREIGN PATENTS OR APPLICATIONS

| 135,622 | 11/1933 | Germany | 356/207 |

Primary Examiner—William F. Lindquist
Attorney, Agent, or Firm—A. Donald Stolzy

[57] ABSTRACT

A photometric analyzer to monitor oone or more constituents of a mixture, such as by producing indications of the concentrations of sulfur dioxide and nitrogen dioxide in flue gases. A rotating wheel carries appropriate filters, and the outputs of reference and measuring filters are time shared. A photomultiplier is operated to produce a logarithmic function in accordance with Beer's Law. Logarithmic functions of the reference and measuring filter outputs are subtracted by the use of circuits including an amplifier. A voltmeter calibrated in concentration is then connected from the amplifier.

17 Claims, 18 Drawing Figures

PATENTED MAR 12 1974
3,796,887
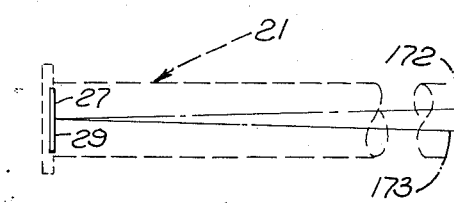
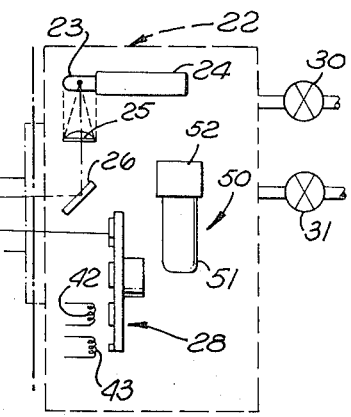
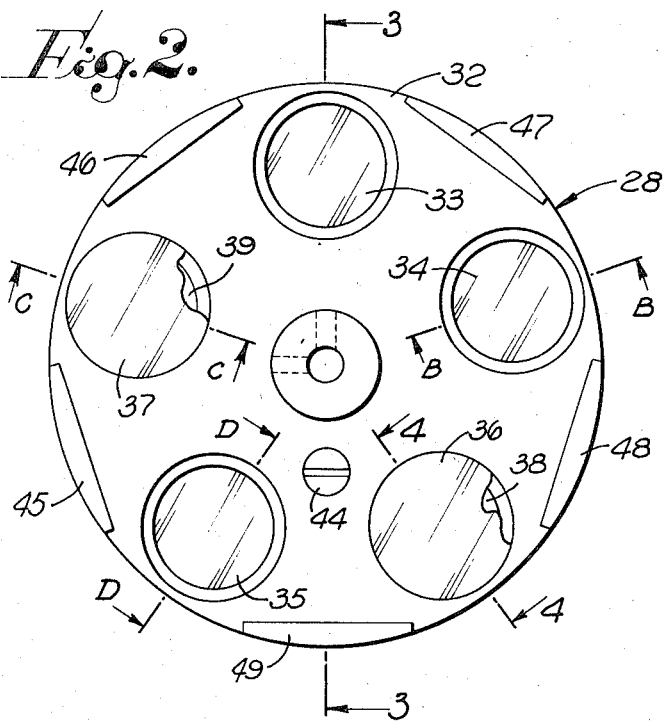
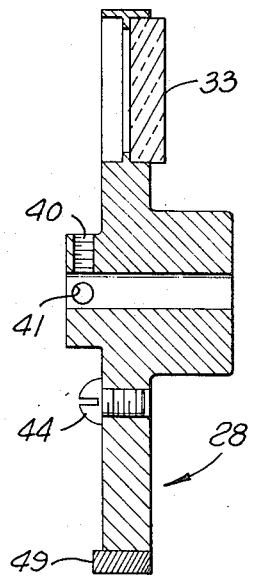
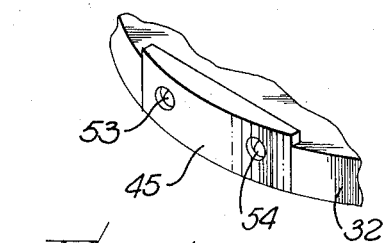
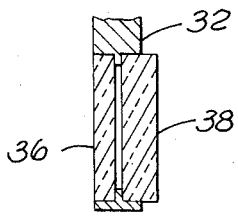

PHOTOMETRIC ANALYZER

BACKGROUND OF THE INVENTION

This invention relates to devices for producing output signals directly proportional to the concentration of the constituent of a mixture, and more particularly, to a photosensitive measuring system.

A photometric device is described herein for the analysis of flue or stack emissions. Most of the pollutant gases found in stack emissions absorb either ultraviolet or visible light, and from the amount of light absorbed, the concentration of the gas can be determined. The basic law of photometry upon which most photometers are built is Beer's Law. This law relates the light absorbed to the concentration of the absorbent:

$$\text{Log } I_o - \text{Log } I = abc \quad (1)$$

where $I_o$ is the intensity of light of a given wavelength with no absorbing gases present, $I$ is its intensity after passing through the absorbent gas, $a$ is a constant depending only on the gas and the wavelength of light used; $b$ is the pathlength of the light through the absorbent gas; and $c$ is the concentration of the absorbent gas. Therefore, knowing the difference in the logarithms of the intensity of the light with and without the absorbent present, the constant and the path length, the concentration of the absorbent gas can be determined. In practice under a given set of conditions, the pathlength does not change so that the product of the constant $a$, and the pathlength is a constant which can be ascertained by calibrating the photometer with a known concentration of the gas of interest. Therefore, in sampling only the concentration is unknown and equation (1) can be solved for the concentration.

One prior art stack gas analyzer passes the light through the sample and then divides the beam into two parts. Each beam then passes through a filter. One filter allows light transmission at a reference wavelength which is not absorbed by the gas whose concentration is desired. The other beam allows transmission of light at a wavelength which is absorbed by the gas. The intensity of the non-absorbed wavelength is balanced against the intensity of the absorbing wavelength when there is no gas present. The non-absorbing wavelength can, therefore, be used to measure the reference intensity $I_o$. By using separate detection systems for each wavelength and the proper use combination of logarithmic amplifiers and a differential amplifier, the quantity Log $I_o$ − Log $I$ can then be determined continuously. The effects of interfering gases are nullified by picking the reference and measuring wavelengths such that there is either no absorption or equal absorption at each wavelength. Anything that might change the intensity of the light such as particulates in the sample, or dirty optics, has equal effect on both beams and does not effect the analysis.

A drawback to the above-described prior art instrument is that only one gas at a time can be monitored. To analyze for another gas requires changing filters. And if it is required to monitor two gases simultaneously, as is the case with the Claus sulfur recovery processes and frequently with power boiler emissions, two instruments are required.

Another drawback common to the said prior art instrument and many others is that the sample must be withdrawn from the stack for analysis. This generally requires heating the sample lines leading to the instrument. Even then, however, the sample is not identical to the sample as it was taken from the stack. Probably both the temperature and the pressure are significantly different than those found in the stack.

SUMMARY OF THE INVENTION

The photometer described in this disclosure overcomes the abovedescribed and other difficulties by placing the optical pathlength within the stack and measuring the gas concentration in the stack environment.

A probe is placed in the stack. The probe has a mirror on the end in the stack such that the light is passed down the probe to the mirror and is reflected back to the instrument. The probe has many holes in it to allow the free passage of the stack gases. It also has air lines to purge the probe of stack gases for zeroing and calibrating. Also both the mirror and the front window are swept by an air curtain to minimize settling of materials on these optical surfaces.

As the light reenters the instrument from the sample probe, it passes through a filter wheel which ascertains which wavelengths reach the detector. This filter wheel contains five transmission filters which are sufficient for the analysis of two different gases simultaneously. The filters include a common reference wavelength for each gas and a calibration filter for each gas. The calibration filter consists of a measuring filter in conjunction with a neutral density filter of known density. The known neutral density filter represents the absorption of a known quantity of the gas to be measured.

The filter wheel rotates rapidly (400 – 1,200 rpm) and on each rotation the intensity of the light through the reference filter and at least one of the other filters is sensed. If the instrument is analyzing the sample or zeroing, the measuring filter of one or both gases is being compared to the reference. If the instrument is in the calibration mode, one or both calibration filters are being compared with the reference. In the zeroing and calibration mode, the probe is being purged with air which does not contain either gas being analyzed.

The instrument of the present invention can be used for measuring the concentration of any one, two, three or more gaseous substances which absorb light in the visible or ultraviolet regions of the spectrum. Such gases include, for example, sulfur dioxide, nitrogen dioxide and hydrogen sulfide. It can, therefore, be used to monitor emissions from power boilers and recovery furnaces. Being able to measure both sulfur dioxide and hydrogen sulfide simultaneously, it can be used for process control in the Claus sulfur recovery process. The instrument also can be used to measure the parameters relating to smoke density and turbidity. The instrument of the present invention may also be used to analyze pollutants which absorb in the infrared regions of the spectrum.

The above-described and other advantages of the present invention will be better understood from the following detailed description when considered in connection with the accompanying drawings.

BRIEF DESCRIPTION OF THE DRAWINGS

In the drawings which are to be regarded merely as illustrative:

FIG. 1 is a diagrammatic view of a photometric analyzer constructed in accordance with the present invention;

FIG. 2 is a front elevational view of a rotatable wheel shown in FIG. 1;

FIG. 3 is a vertical sectional view through the wheel taken on the line 3—3, shown in FIG. 2;

FIG. 4 is a sectional view of a portion of the wheel taken on the line 4—4 shown in FIG. 2;

FIG. 5 is a broken away perspective view of a portion of the wheel shown in FIG. 2;

DESCRIPTION OF THE PREFERRED EMBODIMENT

Figure 6:
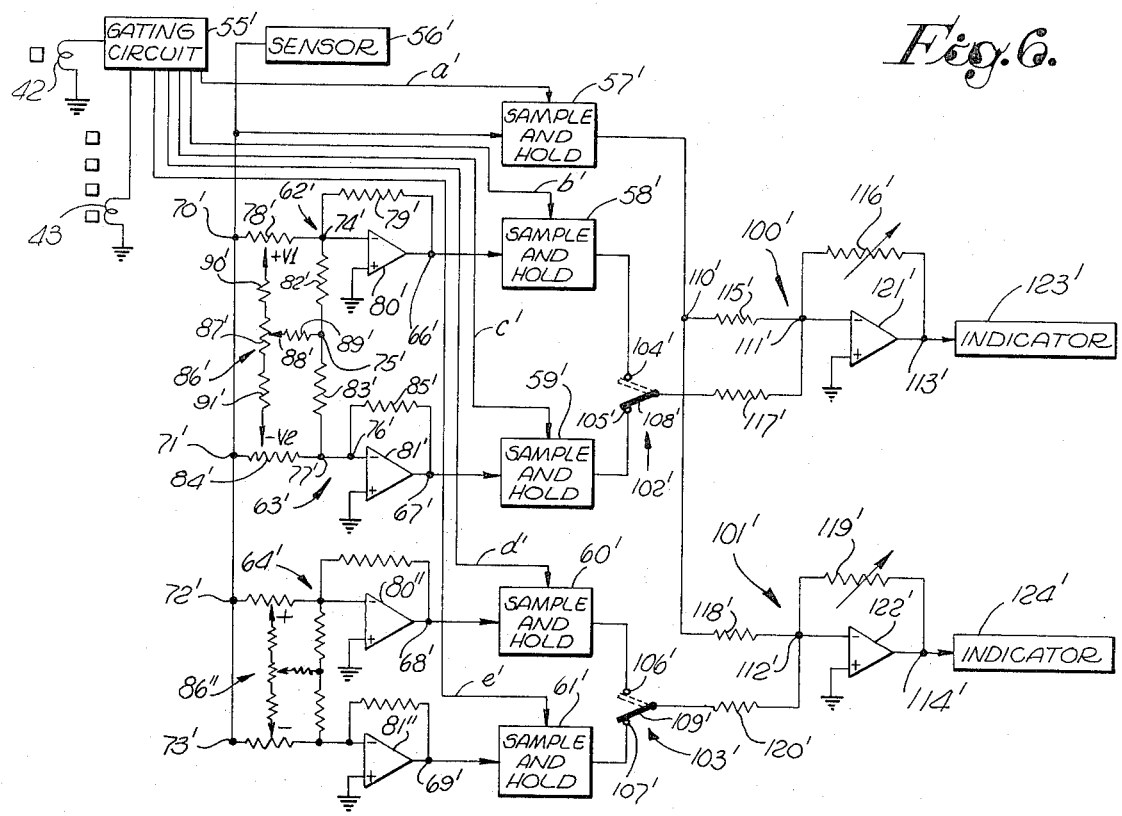
FIG. 6 is a diagrammatic view of the electrical portion of the analyzer.

In FIG. 1, a photometric analyzer constructed in accordance with the present invention is indicated at 20 including a probe 21, and a housing 22 fixed relative to and contiguous to probe 21.

A mercury lamp 23, having a base 24, is fixed relative to housing 22 inside thereof. A collimator lens 25 collimates the light which emanates from the lamp 23. This light is then reflected off of a mirror 26 to a mirror 27 fixed relative to probe 21 at the left end thereof, as viewed in FIG. 1. The light reflected from mirror 26 is then reflected back toward a wheel 28 from a point 29 on mirror 27.

As will be explained, valves may be provided at 30 and 31 to admit air under pressure to probe 21 for two purposes. One purpose is to provide an "air curtain" at each end of probe 21 contiguous to windows therein, not shown in FIG. 1, to keep the windows clean.

Air may also be applied to purge the probe 21 of any gas except air periodically for calibration purposes, as will be described.

Thus, typically, valve 30 may be turned on to establish the air curtain at each window. Valve 31 may be turned on to purge the probe 21 with air.

As shown in FIG. 2, wheel 28 includes a disc 32 which has filters 33, 34 and 35 fixed thereto. Wheel 28 also has neutral density filters 36 and 37 fixed thereto. A sectional view taken on the line 3—3 would appear as in FIG. 3. However, sectional views taken on the lines B—B and D—D would also be identical to the view of FIG. 3.

A filter 38 is fixed to disc 32 as indicated in FIG. 4 adjacent neutral density filter 36. A section taken on the line C—C in FIG. 2 would be identical to that shown in FIG. 4. Another filter 39 is thus positioned adjacent neutral density filter 37.

The photometric analyzer 20 is employed to detect both sulfur dioxide and nitrogen dioxide in flue gases. For this purpose, filter 33 may be described as a reference filter having an effective wavelength of 546 nanometers. Filter 34 may be described as the $SO_2$ measuring filter with an effective wavelength of 313 nanometers.

Filter 38 may be described as the $SO_2$ calibrate filter, and may have an effective wavelength of 313 nanometers.

Filter 35 may be described as the $NO_2$ measuring filter and may have an effective wavelength of 435 nanometers.

Filter 39 may be described as the $NO_2$ calibrate filter, and have an effective wavelength of 435 nanometers.

Although this invention is by no means limited to measuring the concentration of $SO_2$ and/or $NO_2$, for the purposes herein, both neutral density filters 36 and 37 may transmit the same portion of all wavelengths of light. This portion is preferably 1/1,000 of light which illuminates each.

As shown in FIG. 3, threaded set screw holes are provided at 40 and 41 for fixing wheel 28 to a drive shaft, to be described. The drive shaft is driven by a motor at a constant speed, although this is not critical.

As shown in FIG. 1, magnetic pickups are provided at 42 and 43. A voltage pulse is induced in pickup 42 when a ferromagnetic screw 44 passes by it, as shown in FIGS. 2 and 3.

Wheel 28 has ferromagnetic slugs 45, 46, 47 and 48 fixed thereto, as shown in FIG. 2. When these slugs pass pickup 43, a voltage pulse is, each time, induced in pickup 43. A slug is provided at 49 which is made of stainless steel and is used as a counterbalance. All of the slugs shown in FIG. 2 are equally spaced. The same is true of the filters. The filters are also positioned midway between each immediately adjacent pair of slugs.

In FIG. 1, when wheel 28 turns, each filter in succession is passed through the light beam from mirror 27. Whatever is passed by each filter or combination of filters is then received by a photomultiplier 50, shown in FIG. 1, having a tube portion 51 and a base 52.

Each of the slugs shown in FIG. 2 is fixed relative to disc 32 by a pair of corresponding screws 53 and 54, as shown in FIG. 5. In FIG. 5, slug 45 is shown by way of example.

Figure 7:
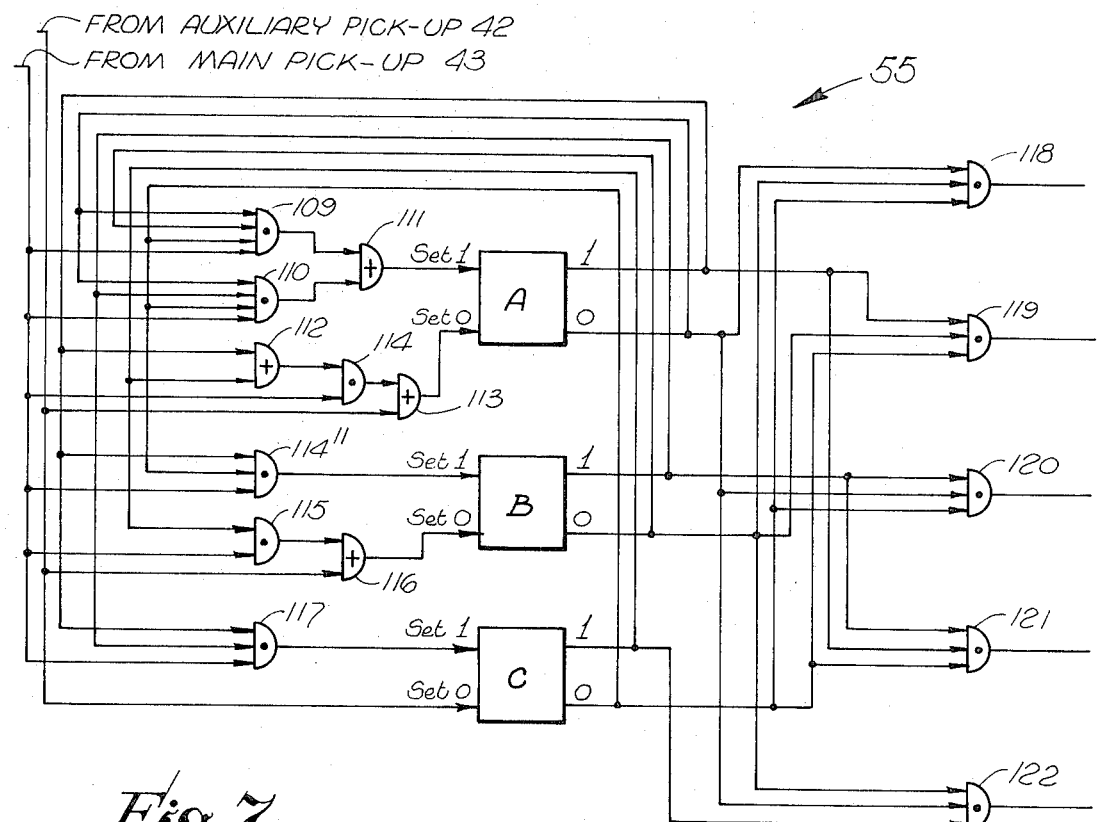
FIG. 7 is a block diagram of a gating circuit shown in FIG. 6.

In FIG. 7, pickups 42 and 43 are shown connected to a gating circuit 55'.

Also shown in FIG. 7 are sample and hold circuits 57', 58', 59', 60' and 61'.

Also shown in FIG. 7 is a sensor 56' which is connected to one input of sample and hold circuit 57' and to the inputs of analog adders 62', 63', 64' and 65'. The outputs of adders 62'–65' are taken at junctions 66', 67', 68' and 69', respectively. The outputs at junctions 66'–69' are inverted from the inputs at junctions 70', 71', 72' and 73', respectively. Analog adders 62'–65' provide for zeroing, as will be described.

Adders 62' and 63' are respectively substantially identical to adders 64' and 65', respectively. Adders 64' and 65' will, therefore, not be described in detail.

All of the input junctions 70'–73' are connected from the output of sensor 56'. Adder 62' has junctions at 74' and 75'. Junction 75' is also a common junction of adder 63' because the same constant voltage, plus and minus, is added in the case of both adder 62' and adder 63'. Adder 63' includes a junction at 77'.

Adder 62' includes a resistor 78' connected between junctions 70' and 74'. A feedback resistor 79' is connected between junctions 74' and 66'. Junction 66' is connected to an input to sample and hold circuit 58'. Junction 74' is connected to the inverting input of amplifier 80'. Similarly, adder 63' includes an amplifier 81'. A resistor 82' is connected between junctions 74' and 75'. A resistor 83' is connected between junctions 75' and 77'. A resistor 84' is connected between junctions 71' and 77'. A feedback resistor 85' is connected between junctions 76' and 67'. Junctions 77' and 76' are connected together and to the inverting input of amplifier 81'. The non-inverting input of amplifiers 80' and 81' are connected to ground.

A potentiometer is provided at 86' having a winding 87', and a wiper 88'. A resistor 89' is connected between wiper 88' and junction 75'. A resistor 90' is connected from the upper end of winding 87' to a potential +V1. A resistor 91' is connected from the lower end of potentiometer winding 87' to a potential −V2.

Gating circuit 55' has output leads $a'$, $b'$, $c'$, $d'$ and $e'$ connected respectively to circuits 57'–61'.

Another pair of analog adders are provided at 100' and 101'. Single-pole, double-throw switches are provided at 102' and 103'. Switch 102' has a contact 104' connected from the output of circuit 58'. switch 102' has a contact 105' connected from the output of circuit 59'. Switch 103' has a contact 106' connected from the output of circuit 60'. Switch 103' has a contact 107' connected from the output of circuit 61'. Switches 102' and 103' have poles 108' and 109', respectively. A junction is provided at 110' connected from the output of circuit 57'. Junctions are provided at 111', 112', 113' and 114'.

A resistor 115' is connected between junctions 110' and 111'. A variable feedback resistor 116' is connected between junctions 111' and 113'. A resistor 117' is connected between pole 108' and junction 111'. A resistor 118' is connected between junction 110' and junction 112'. A feedback resistor 119' is connected between junctions 112' and 114'. A resistor 120' is connected between switch pole 109' and junction 112'. A differential amplifier 121' has a converting input connected from junction 111' and an output connected to junction 113'. A differential amplifier 122' has an inverting input connected from junction 112' and an output connected to junction 114'. Both of the noninverting inputs of amplifiers 121' and 122' are connected to ground. An indicator 123' is connected from junction 113'. An indicator 124' is connected from junction 119'.

Sensor 56' may include the photomultiplier 50 and the circuit therefor. Both the photomultiplier and the circuit are entirely conventional. Moreover, it is conventional to operate a photomultiplier to give a D.C. output voltage which is equal to the common logarithm of the input thereto. According to this feature of the invention, the need for logarithmic amplifiers, which are notoriously inaccurate, or other devices to produce an output signal directly proportional to the logarithm of concentration are not needed.

Indicator 123' may simply be a voltmeter calibrated in concentration (e.g., volume per unit volume). Alternatively, indicator 123' may be a recording voltmeter. Indicator 124' may be identical to indicator 123', if desired. However, this is not necessarily true.

As shown in FIG. 7, gating circuit 55' may be similar to a binary counter with additional gates. Pickup 42 may be described as "an auxiliary pickup." Pickup 43 may be described as "a main pickup."

In FIG. 7, flip-flops are shown at A, B and C having corresponding set "1" and set "0" inputs. Flip-flops A, B and C are set by corresponding gates and provide outputs to other gates.

The set "1" input of flip-flop A is provided by AND gates 109 and 110, and an OR gate 111. The set "0" input to flip-flop A is provided by OR gates 112 and 113, and an AND gate 114. The set "1" input to flip-flop B is provided by an AND gate 114. The set "0" input of flip-flop B is provided by an AND gate 115 and an OR gate 116. The set "1" input of flip-flop C is provided by an AND gate 117. The set "0" input of flip-flop C is provided from auxiliary pickup 42. The logic for the control is then $$1A = \bar{A}\,\bar{B}\,\bar{C}\,Cp + \bar{A}\,B\,\bar{C}\,Cp$$

$$0A = (A + C)\,Cp + R$$

$$1B = A\,\bar{C}\,Cp$$

$$0B = C\,Cp + R$$

$$1C = A\,B\,Cp$$

$$0C = R$$

where, $Cp$ represents the output pulse from main pickup 43, and $R$ represents the output pulses of auxiliary pickup 42.

What the counter does then is to count according to the following truth table:

| Count | C | B | A |
|---|---|---|---|
| 0 | 0 | 0 | 0 |
| 1 | 0 | 0 | 1 |
| 2 | 0 | 1 | 0 |
| 3 | 0 | 1 | 1 |
| 4 | 1 | 0 | 0 |
| 0 | 0 | 0 | 0 |
| 1 | 0 | 0 | 1 |

The counter is invariably reset to "0" by each output pulse of auxiliary pickup 42. The counter thus has only five different stable states. Each of these states is detected by AND gates 118, 119, 120, 121 and 122 which have the respective output leads shown in FIG. 7 of $a'$, $b'$, $c'$, $d'$ and $e'$. The logic of each of these gates, respectively, is $\bar{A}\,\bar{B}\,\bar{C}$, $A\,\bar{B}\,\bar{C}$, $\bar{A}\,B\,\bar{C}$, $A\,B\,\bar{C}$ and $\bar{A}\,\bar{B}\,C$.

The outputs of gates 118, 119, 120, 121 and 122 in FIG. 6 are respectively connected to sample and hold circuits 57', 58', 59', 60' and 61'.

Figure 8:
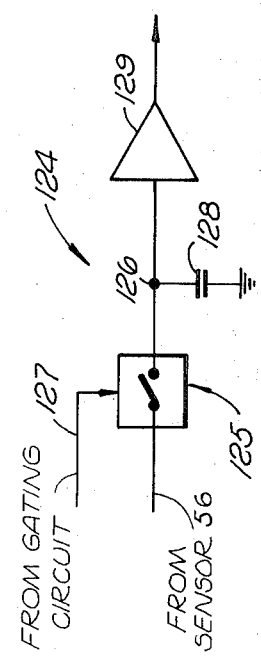
FIG. 8 is a diagrammatic view of a sample and hold circuit, five of which are shown in FIG. 6.

Each sample and hold circuit shown in FIG. 6 may be identical to a sample and hold circuit 124, shown in FIG. 8, including a sampling switch 125 connected from sensor 56 to a junction 126. The time that switch 125 is closed is determined by the pulse width at the output of one of the AND gates 118–122, shown in FIG. 7. One corresponding such AND gate is thus connected to switch 125 over a lead 127. A storage capacitor 128 is connected from junction 126 to ground. An output amplifier 129 is connected from junction 126.

Figure 9:
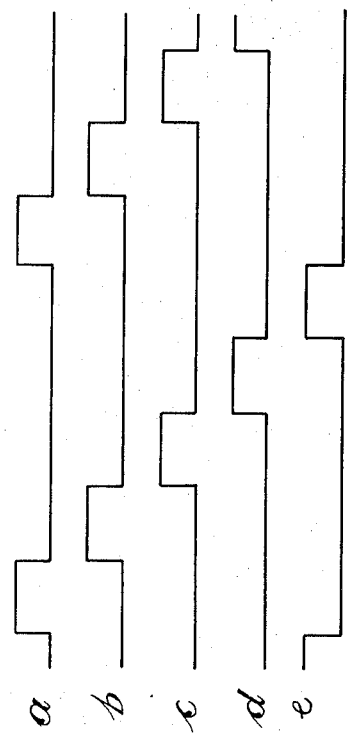
FIG. 9 is a graph of a group of waveforms characteristic of the operation of the gating circuit shown in FIG. 7.

Pulses are supplied to switch 125 of one of the types shown in FIG. 9 over lead 127. Thus, the outputs of gates 118, 119, 120, 121 and 122 are respectively indicated at a, b, c, d and e in FIG. 9.

Note will be taken in FIG. 9 that each of the pulse trains a, b, c, d and e utilize sets of pulses, the pulses of each set having a constant width for each set. The pulse repetition frequency is also the same throughout the waveforms of FIG. 9. Only the phase has been changed. Note will be taken that one pulse begins at the termination of a preceding pulse. The pulse width is equal to one-fifth of the pulse period.

Figure 10:
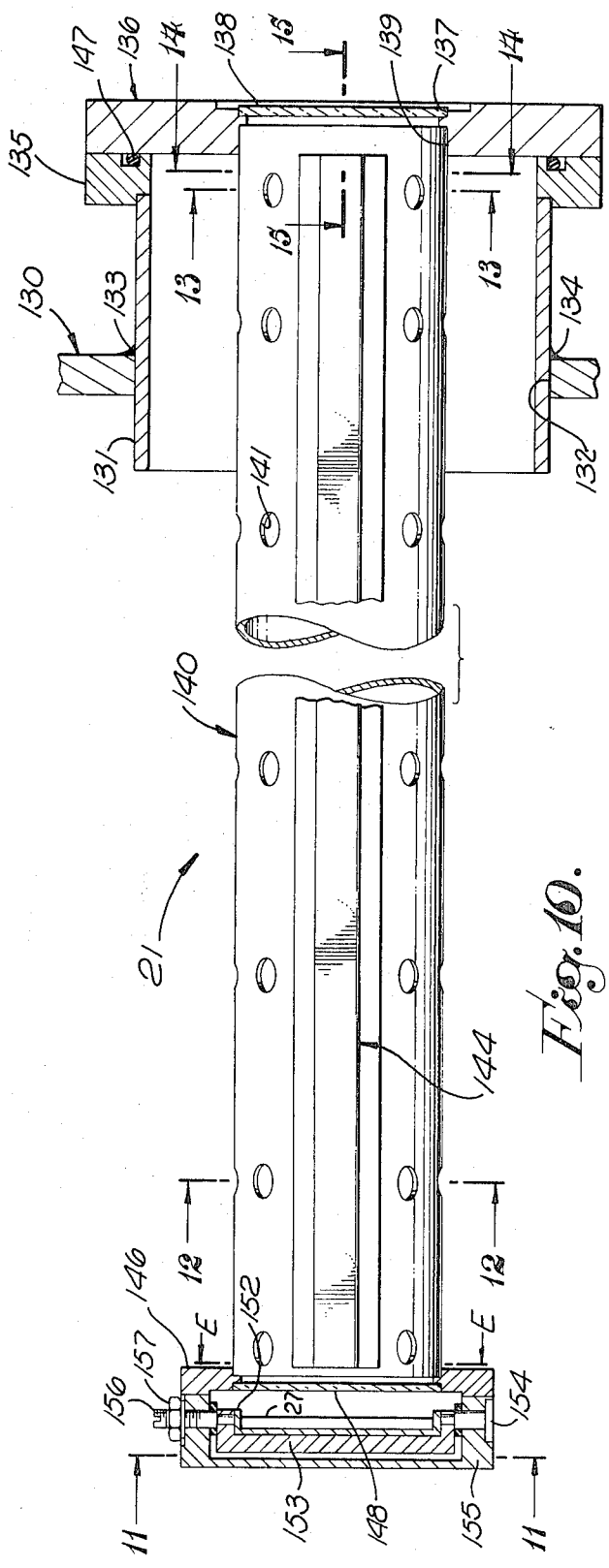
FIG. 10 is a side elevational view, partly in section, of a probe for mounting inside a flue or stack.

Probe 21 is illustrated in greater detail in FIG. 10. A plate 130 represents the wall of a flue. A mounting cylinder 131 is fixed in a bore 132 of plate 130 by welding at 133 and 134.

A ring 135 is fixed to cylinder 131 by welding or otherwise, not shown. A plate 136 is preferably bolted to ring 135, in assembly, by bolts, not shown. Plate 136 is fixed to housing 22, shown in FIGS. 1 and 16.

Plate 136 in FIG. 10 has an annular groove 137 therein in which a transparent window 138 is fixed. Plate 136 also has a groove 139 in which a hollow cylindrical tube 140 is fixed.

Figure 12:
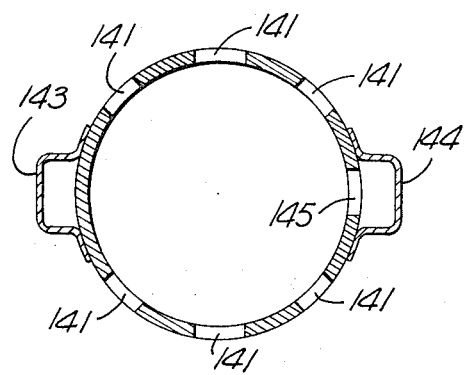
FIG. 12 is a transverse sectional view of the probe taken on the line 12—12, shown in FIG. 10.
Figure 13:
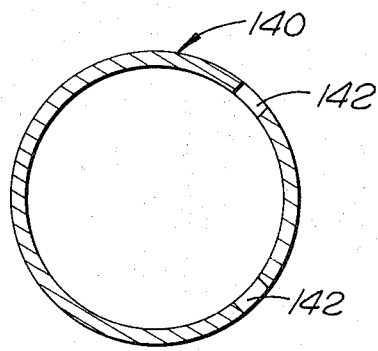
FIGS. 13 and 14 are additional transverse sectional views through the probe taken on the lines 13—13 and 14—14, respectively.

Tube 140 has holes therethrough at 141 that extend completely therearound and substantially all along the length thereof. Holes are also provided at opposite ends, as indicated at 142 in FIG. 13. Holes 141 are shown again in FIG. 12. Also shown in FIG. 12 are two hat-shaped sections 143 and 144. Section 144 covers a row of holes 145. Air is thus supplied to the interior of section 144 for purging probe 21 with air. Hat-shaped section 144 is closed at its left end, as viewed in FIG. 10. However, this closure cannot be seen because a portion of a ring 146 has been removed due to the section taken.

At its right end, section 144, as shown in FIG. 10, may be sealed except for a tube inserted thereinto out of which air under pressure can flow down section 144 therewith into the interior of tube 140 through the row of holes 145. Holes 145 may have a lengthwise spacing identical to the holes 141, if desired.

As shown in FIG. 10, if desired, an O-ring seal 147 may be provided between plate 136 and ring 135.

Figure 14:
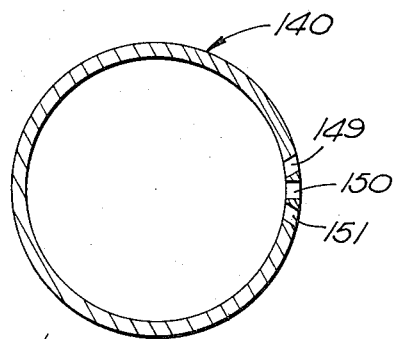

Section 143, shown in FIG. 12, is employed to provide the air curtain at opposite ends of the tube 140. The window opposite window 138 is fixed in ring 146 at 148. The air curtains are provided because there are no holes between hat-shaped section 143, as shown in FIG. 12, except at the ends thereof indicated at 149, 150 and 151 in tube 140 in FIG. 14. The view of FIG. 14 would be the same if taken on the line E—E, shown in FIG. 10.

Figure 11:
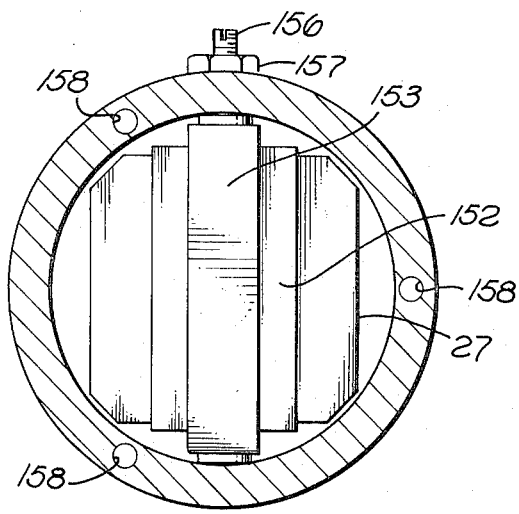
FIG. 11 is a transverse sectional view of the probe taken on the line 11—11, shown in FIG. 10.

Mirror 27 is again shown in FIGS. 10 and 11 fixed to a bracket 152 that is fixed to a yoke 153. Yoke 153 is fixed to a pin 154 rotatable in a bracket 155. Mirror 27 is rotatable by adjustment of a screw 156 which has a lock nut 157 thereon.

Screws, not shown, are slidable through holes 158 through bracket 155 and are threaded into ring 146.

Figure 15:
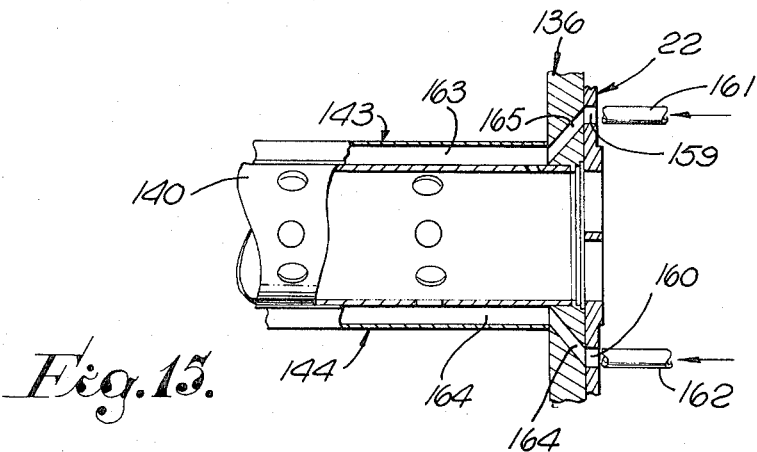
FIG. 15 is a longitudinal view, partly in section, of the probe shown in FIG. 10, and taken on the line 15—15 therein.

Housing 22, shown in FIG. 15, has openings 159 and 160 through which air may pass for providing the air curtain and purging, respectively. If desired, air inlet tubes 161 and 162 may be sealed in openings 159 and 160, respectively. Sections 143 and 144 form passages 163 and 164, respectively, with tube 140, as shown in FIG. 15.

Passage 163 is connected to opening 159 by a hole 165 through plate 136. Similarly, passage 164 is connected to opening 160 by a hole 166. If desired, holes 165 and 166 may be identical in size and shape. They also may be substantially cylindrical having their axes lying in a plane through the axis of tube 140. The holes 165 and 166 may be, if desired, 45° holes.

Figure 16:
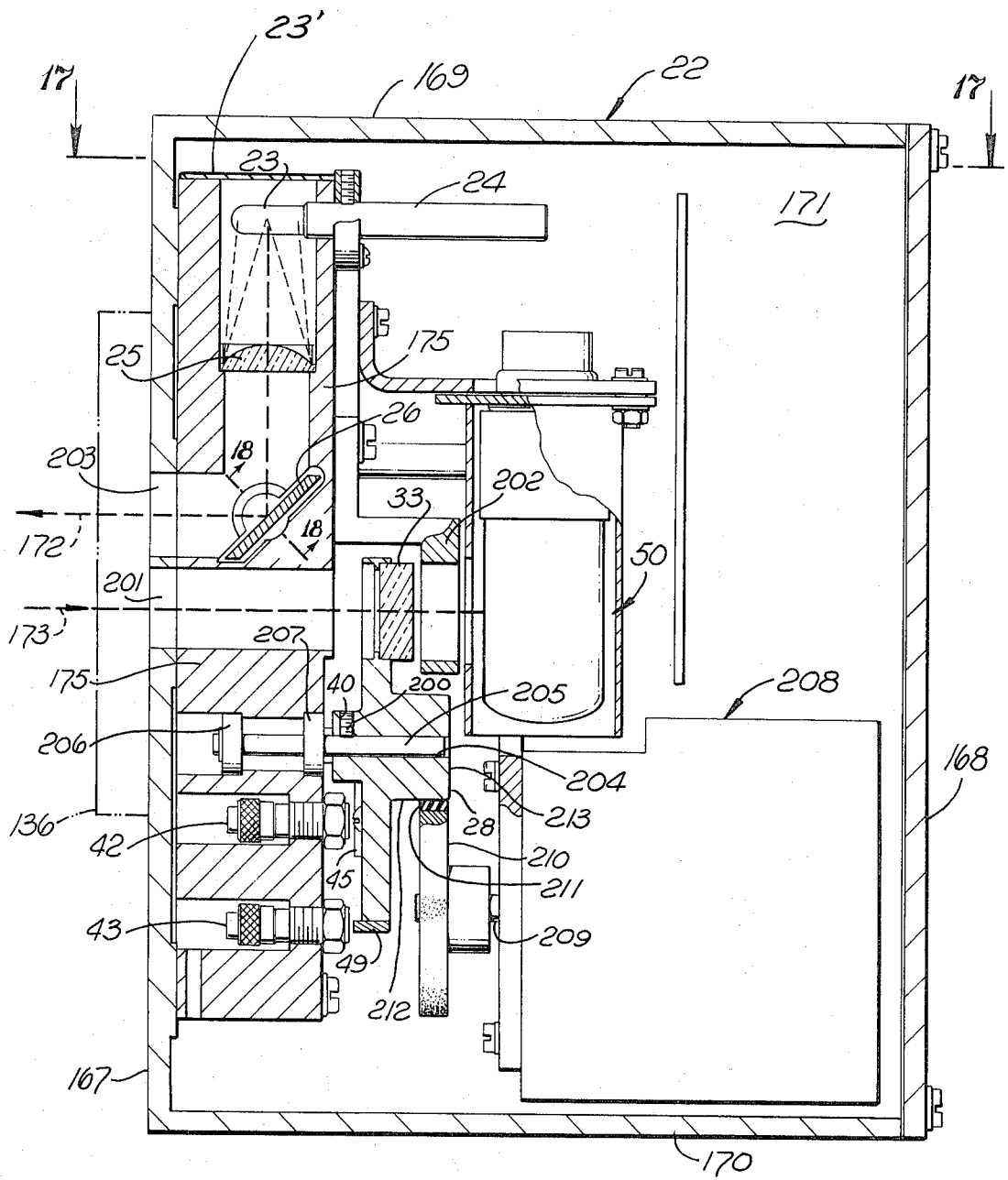
FIG. 16 is a vertical sectional view through a housing which is fixed contiguous to the probe.

In FIG. 16, housing 22 includes front and rear panels 167 and 168, respectively. Housing 22 also includes top and bottom panels 169 and 170, respectively. Housing 22 also includes two side panels 171 and 171', respectively, only one of which is shown in FIG. 16. All of the panels 167–171 and 171' are fixed relative to each other by any conventional means. They preferably form a generally rectangular box. The box is preferably light tight. In this regard, in FIG. 10, a perforate tube may be provided spaced from, but concentric with, tube 140 with apertures staggered relative to apertures 141 to prevent light inside the stack from entering photomultiplier 50, shown in both of FIGS. 1 and 16.

Lamp 23, lens 25 and mirror 26 are again shown in FIG. 16. Due to the fact that the view of FIG. 16 is greatly enlarged over that portion of the apparatus shown in housing 22 in FIG. 1, lines 172 and 173 showing a single central ray of light appear to be parallel. This is true because the angle that these lines make with respect to each other is very small. The perpendicular distance between lines 172 and 173 is quite small in comparison to the distance that mirror 27 is from mirror 26 in FIG. 1. Note lines 172 and 173 in FIG. 1. The angle that they make may be about 1°. If desired, FIGS. 2, 3, 4 and 10–18 may be considered full scale drawings.

Figure 18:
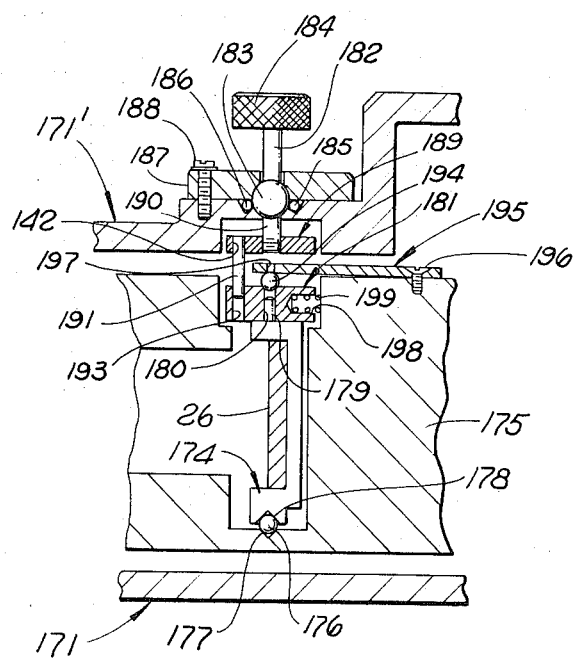
FIG. 18 is a sectional view taken on the line 18—18, shown in FIG. 16.

Mirror 26 is mounted as shown in FIG. 18 in an arrangement which is equivalent to gimbals. Mirror 26 is fixed to a bracket 174.

A supporting structure 175 is fixed relative to housing 22 inside thereof in FIG. 18. Bracket 174 is rotatable on a ball 176 which fits in a groove 177 in structure 175 and a groove 178 in bracket 174.

Bracket 174 also has a pin 179 fixed rigidly therewith that is press fit in a hole 180 in a connecting part 181. Pin 179 is thus fixed rigidly with respect to part 181.

As shown in FIG. 18, an adjustment shaft 182 is fixed to a ball 183 which is rotatable to a limited extent about its center in any direction. shaft 182 has a knurled knob 184 fixed to its upper end. Panel 171' has a groove 185 therein in which an O-ring 186 is trapped by a plate 187 that is fixed to the outer surface of side panel 171' by three cap screws 188, only one of which is shown in FIG. 18 for clarity.

Another stub shaft 190 is fixed to the lower end of ball 183. A disc 189 is fixed to the end of shaft 190. A pin 191 is press fit through a hole 192 in disc 190 and is thereby fixed relative thereto. Pin 191 extends into a hole 193 that goes all the way through part 181.

There is a sloppy fit between pin 191 and hole 193 to permit some movement of the parts when ball 183 is rotated about an axis through its center perpendicular to the drawing of FIG. 18.

Hole 180 in part 181 goes all the way through FIG. 181. A ball 194 covers the upper end of hole 180 and acts as a pivot for part 181. A leaf spring 195 is fixed to structure 175 by two screws 196, only one of which is shown in fIG. 18. Leaf spring 195 has a hole 197, the lower end of which is covered by ball 194.

Part 181 has a recess 198 therein in which a helically coiled spring 199 is located to bias part 181 on the, more or less, right-hand surface of pin 191, as shown in FIG. 18.

Light entering the housing 22 in the direction of line 173 then passes through one of the filters 33, 34 and 35, or through both of the filters 36 and 38 or through both of the filters 37 and 39.

Although wheel 28 rotates continuously at a substantially constant angular velocity, one of its positions during the rotation thereof is indicated again in FIG. 16. Wheel 28 is shown with filter 33. Light can thus pass to photomultiplier 50 by entering a cylindrical opening 201 in housing 22 through front panel 167, passing through filter 33 and through a filter stop 202.

Light traveling in the direction of line 172 exits through a cylindrical opening 203 in housing 22. Wheel 28 has a central cylindrical bore 204 through which a cylindrical shaft 205 projects, wheel 28 being fixed to shaft 205 by two set screws 200 in the respective threaded holes 40 and 41, shown in FIG. 3. Shaft 205 is maintained in a fixed axial, but rotatable, position in conventional bearings 206 and 207 which are, in turn, fixed in structure 175.

A conventional electric motor 208 is provided with an output shaft 209 fixed to a driving disc 210. A layer of rubber is bonded at 211 to the periphery of disc 210. Wheel 28 and motor 208 are then mounted in positions such that layer 211 provides a friction drive for wheel 28 on a cylindrical portion 212 of a hub 213 of wheel 28. Pickups 42 and 43, which may be entirely conventional, are again indicated in FIG. 16.

In FIG. 16, slugs 47 and 48 are omitted due to the section taken. Slug 46 has been omitted for clarity.

Figure 17:
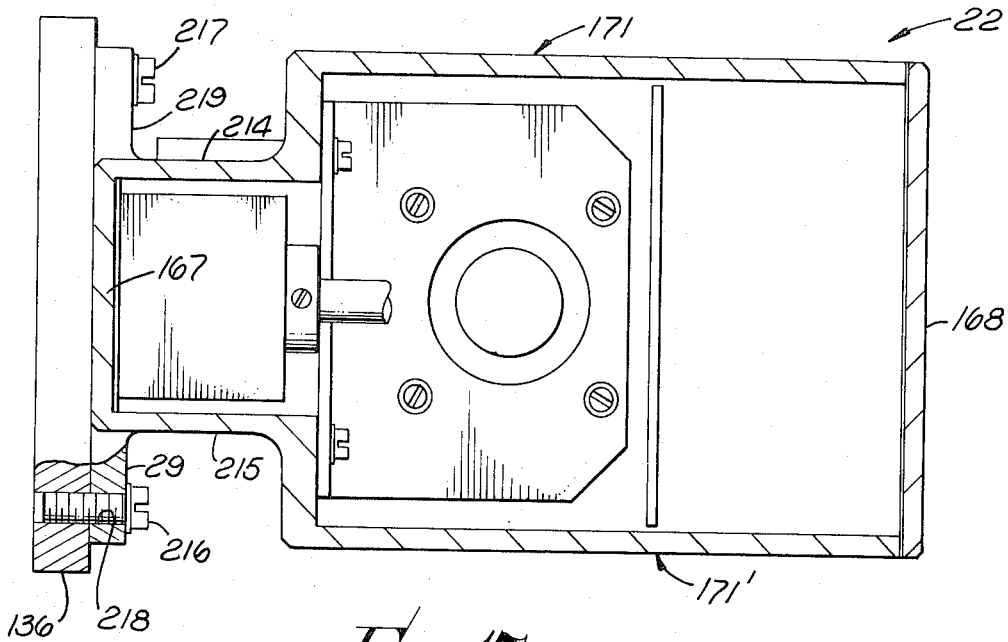
FIG. 17 is a transverse sectional view taken on the line 17—17, shown in FIG. 16.

As shown in FIG. 17, if desired, side panels 171 and 171' may have necked down portions 214 and 215, respectively.

Also, as shown in FIG. 17, plate 136 is fixed relative to housing 22 by cap screws 216 and 217 which are threaded to plate 136 and extend through corresponding holes 218 in ears 219 fixed to opposite sides of side panels 171 and 171', respectively.

OPERATION

The embodiment of the present invention disclosed herein provides an indication, recorded or not, of the concentrations of $SO_2$ and $NO_2$ in stack gases.

One outstanding feature of the invention is the use of the probe 21 which actually extends into a stack. This solves many problems in transporting a sample of stack gases from a stack to an instrument employed to produce an indication of concentration.

Still another feature of the present invention resides in the use of time-shared reference-measure-calibrate arrangements where the selfsame optical path is selected for not only the reference filter, but also the measuring filter and the calibration filter for gas being monitored. Moreover, a single reference filter may be used in producing an indication of the concentration of more than one gas. For example, not only two, but three or more gases may be monitored at the same time.

As stated previously, it is entirely conventional to operate a conventional photomultiplier such as photomultiplier 50 to produce an output which is a logarithmic function of the light illuminating the same. This is, therefore, done in accordance with the present invention. It is, therefore, not necessary to otherwise linearize the output of the present invention because Beer's Law involves a logarithmic function. The logarithmic function in Beer's Law is taken care of by the logarithmic function provided by photomultiplier 50 and its conventional associated circuit. Sensor 56, in FIG. 6, may include photomultiplier 50, as stated previously, and may be identical to the logarithmic photometer disclosed on pages 99 et seq. in a book entitled, "RCA Photomultiplier Manual," published by RCA Electronic Components, Harrison, New Jersey (1970).

During the operation of the photometric analyzer 20, shown in FIG. 1, lamp 23 provides light, which light is collimated by lens 25 and reflected by mirror 26 toward mirror 27. The light thus is transmitted through the interior of the tube 140, shown in FIG. 10, along the line 172, shown in FIG. 1. After it reaches the mirror 27, shown in FIG. 1, the light is reflected along the line 173 back through the gases inside tube 140.

The transmission of light along lines 172 and 173 results in light of some wavelengths according to the absorption spectra of $SO_2$ and/or $NO_2$ being attenuated. It is, by knowing the absorption spectra of $SO_2$ and/or $NO_2$, possible then to determine not only the presence or absence of $SO_2$ and $NO_2$ in the stack gas mixture, it is also possible to determine the concentration of the $SO_2$ and the $NO_2$ therein.

The use of the reference filter 33 is required in order to obtain necessary outputs to calculate concentration from Beer's Law.

Measuring filter 34 is required to perform the $SO_2$ concentration measurement according to Beer's Law. Filter 35 is required to obtain the $NO_2$ measurement according to Beer's Law. Filters 36 and 38 are employed for calibration purposes regarding the $SO_2$ measurement. Filters 37 and 39 are employed for calibration in making the $NO_2$ measurement.

As stated previously, wheel 28 is rotated at a substantially constant velocity by motor 208. Such rotation places filters 34, 38, 35 and 39 in succession in that order in the place where the filter 33 is shown in FIG. 16. Photomultiplier 50 thus "sees" light passing through each filter in succession. Thus, during certain successive periods, the output of the photomultiplier 50 indicates a light intensity corresponding to the respective filters.

The output of sensor 56' in FIG. 6 is directly proportional to the common logarithm of the intensity of the light which, at that instant, is passing through a particular one or two of the filters. The output of sensor 56' is thus, more or less, a time-shared signal. Although the output of sensor 56' is impressed upon all of the sample and hold circuits 57'–61', each sample and hold circuit only examples one-fifth of total information and at a time corresponding to one particular filter as determined by pickups 42 and 43, and gating circuit 55'. For example, gate 118 in FIG. 7 has an output as indicated at a in FIG. 9 and opens the gate of sample and hold circuit 57' to sample the output of sensor 56' only when filter 33 lies in the path of light along the line 173 through the filter 33 with the wheel 28 in the position shown in FIGS. 3 and 16.

Sample and hold circuit 57' thus corresponds to filter 33. Sample and hold circuits 58', 59', 60' and 61' then correspond to filters 34, 38, 35 and 39, respectively. Similarly, gates 118, 119, 120, 121 and 122 correspond respectively to filters 33, 34, 38, 35 and 29.

For one part of the calibration, switches 102' and 103' are thrown to their dotted line positions. The position of wiper 88' on potentiometer winding 87' is then varied until indicator 123' shows an output voltage equal to zero. The setting of corresponding potentiometer 86'' is similarly varied until the indicator 124' shows an output voltage of zero.

If desired, an output voltage adequate to produce a full scale indication on indicators 123' and 124' may be employed to indicate, for example, a concentration of 3.0, where the neutral density filters 36 and 37 each transmit the 1/1,000 of the light intensity illuminating the same at all wavelengths. Note that there is a correlation to this and that the logarithm of 1,000 to the base 10 is 3.0. An adjustment for span is made by throwing the switches 102' and 103' to their solid line positions. In this case, the resistance of resistor 116' is adjusted until indicator 123' shows full scale. Similarly, the resistance of resistor 119' is varied until indicator 124' shows full scale.

For operation, after the zero and span corrections, the switches 102' and 103' are again thrown to their dotted line positions. Motor 208 remains energized, wheel 28 rotated at a constant angular velocity and indicators 123' and 124' read. In such reading, indicator 123' produces an indication directly proportional to the concentration of $SO_2$ in the mixture of flue gases. Indicator 124' will produce an indication directly proportional to the concentration of $NO_2$ in the flue gases.

The signals appearing on the switch poles 108' and 109' are substracted from that appearing at the output of sample and hold circuit 57' because amplifiers 80', 81', 80'' and 81'' are all inverter amplifiers, subtraction being required in accordance with Beer's Law.

SUMMARY

It is to be noted that the outputs of amplifiers 121' and 122' in FIG. 6 need not be employed to drive a voltmeter or recorder, but may also be employed to drive other devices or not such as, for example, a process controller.

The word "light," is used herein and in the claims, is hereby defined to include light either visible or invisible to the human eye. This is true even though the present invention may be found to have considerable utility when employed in the ultraviolet spectrum.

The word "concentration," as used herein and in the claims, is hereby defined to include, but not be limited to, the percent of a substance in a mixture of substances by volume.

The word "indicate," as used herein in any of its forms, is hereby defined to mean the production of a signal which has a magnitude directly proportional to concentration.

Mercury lamp 23 may be any conventional lamp having a characteristic mercury spectrum. However, a satisfactory lamp is sold under the trademark "Pen-Ray" and has a Model No. 11SC-2.

Although any conventional photomultiplier tube may be employed for tube 50, one satisfactory photomultiplier has been found to be Radio Corporation of America, Model IP28.

In FIG. 16, a cap 23' prevents light from lamp 23 from reaching photomultiplier 50 except along path 173.

As will be apparent, the upper end of resistor 90' in FIG. 6 is not connected to resistor 78'. Resistor 91' is not connected to resistor 84'. The same is true of the corresponding resistors in adders 64'-65'.

What is claimed is:

1. A photometric analyzer comprising: a light tight housing; a member movable relative to said housing inside thereof, said member having at least first and second light filters fixed relative thereto at first and second different positions thereon, respectively; first means fixed relative to said housing to shine light through a mixture of gases, and subsequently thereto, to shine light through said first and second filters in succession as said member is moved; second means mounted on said housing to move said member, said first filter having a passband effectively at a first wavelength where a first predetermined gas has no substantial absorption, said second filter having a passband effectively at a second wavelength where said first predetermined gas does have substantial absorption; a photomultiplier having a logarithmic output fixed relative to said housing inside thereof in a position to receive light from said first means which has passed through said gas mixture and through said filters, said photomultiplier having an output lead and being adapted to impress an output signal on the said output lead thereof; first and second circuit means connected from said photomultiplier to sample and hold the photomultiplier output signal during first and second times that said photomultiplier is illuminated by the passage of light through said first and second filters, respectively; and third means output from all of said circuit means to indicate a first difference in the magnitudes of the output signal of said photomultiplier at said first and second times, said first difference being directly proportional to the concentration of said first gas.

2. The invention as defined in claim 1, wherein a probe is provided that is adapted to be fixed relative to a stack inside thereof, said probe having a perforate wall, said first means including a device fixed relative to and at the inner probe end to direct light toward said photomultiplier, one of said circuit means including an inverter amplifier connected from said photomultiplier to said third means, and fourth means connected to said probe to purge the interior of said probe with air, said amplifier having an adjustable input to set the output of said third means equal to zero while said probe is purged as aforesaid.

3. The device as defined in claim 1, wherein said member has a third light filter at a position thereon different from those positions of said first and second light filters, said first means being adapted to shine light through said gas mixture and subsequently thereto through each of said light filters in succession as said member is moved, said third light filter having a passband effectively at said second wavelength, a first neutral density filter fixed relative to said member in the optical path through said third light filter, third circuit means connected from said photomultiplier to sample and hold the output signal thereof during the time that said photomultiplier is illuminated by the passage of light through said third light filter and said first neutral density filter, and a single-pole, double-throw switch having a pole connected to said third means and a contact connected from the outputs of said second and third circuit means, respectively, said third means including an amplifier with an adjustable gain to calibrate for full scale when said switch connects said third means to said amplifier.

4. The invention as defined in claim 3, wherein said third means includes a D.C. voltmeter connected from the utput of said amplifier and calibrated in concentration.

5. The invention as defined in claim 1, including a third light filter fixed relative to said member at a position thereon different from the positions of said first and second light filters, said first means also being adapted to shine light through said gas mixture and subsequently thereto through each of said filters in succession, said third filter having a passband effectively at a third wavelength different from said first and second wavelengths where a second predetermined gas has substantial absorption, said second gas having no substantial absorption at said first wavelength, third circuit means connected from said photomultiplier to sample and hold the output signal thereof during the time that said photomultiplier is illuminated by the passage of light through said third filter, said third means also being connected from said third circuit means and being adapted to indicate a second difference in the magnitudes of the output signal of said photomultiplier at first and third times that said first and third filters are respectively located in front thereof, said second difference being directly proportional to the concentration of said second gas.

6. The invention as defined in claim 5, wherein a probe is provided that is adapted to be fixed relative to a stack inside thereof, said probe having a perforate wall, said first means including a device fixed relative to and at the inner probe end to direct light toward said photomultiplier, said second and third circuit means respectively including second and third amplifiers connected from the output of said photomultiplier to said third means, and fourth means connected to said probe to purge the interior of said probe with air, said second and third amplifiers having variable inputs to set the output of said third means equal to zero while said probe is purged as aforesaid, said third means having an adjustable gain amplifier.

7. The invention as defined in claim 6, wherein said member has fourth and fifth light filters at different positions thereon which are also different from the positions of said first, second and third light filters, said first means being adapted to shine light through said gas mixture, and subsequently thereto, through each of said light filters in succession as said member is moved, said fourth and fifth light filters having passbands effectively at said second and third wavelengths, respectively, a first neutral density filter fixed relative to said member in the optical path through each of said fourth and fifth light filters, fourth and fifth circuit means connected from said photomultiplier to sample and hold the output thereof during the time that said photomultiplier is illuminated by the passage of light through said fourth and fifth light filters, respectively, and first and second single-pole, double-throw switches each having a pole connected to said third means and a pair of contacts connected from the outputs of said second and fourth, and third and fifth circuit means, respectively, said third means including a first auxiliary amplifier with an adjustable gain to calibrate for full scale when said switches connect said fourth or fifth circuit means to said first auxiliary amplifier.

8. The invention as defined in claim 7, wherein said member includes a rotatable wheel, said filters being angularly spaced therearound, said second means including a substantially constant speed motor, and pulse generating means responsive to the position of said wheel and having an output connected to said circuit means to cause the same to sample the output signal of said photomultiplier synchronously when a corresponding filter passes through the field of view of said photomultiplier.

9. The invention as defined in claim 8, wherein a counter and first, second, third, fourth and fifth gates are connected from said pulse generating means respectively to said first, second, third, fourth and fifth circuit means to cause said first, second, third, fourth and fifth circuit means to sample over mutually exclusive periods of time.

10. The invention as defined in claim 9, wherein said pulse generating means includes a reset pickup to reset said counter once for each revolution of said wheel.

11. The invention as defined in claim 10, wherein said third means includes a D.C. voltmeter for each said difference, said first auxiliary amplifier being connected to one of said voltmeters, and a second auxiliary, adjustable gain amplifier connected to the other of said voltmeters.

12. The invention as defined in claim 5, wherein said member has fourth and fifth light filters at different positions thereon which are also different from the positions of said first, second and third light filters, said first means being adapted to shine light through said gas mixture and subsequently thereto through each of said light filters in succession as said member is moved, said fourth and fifth light filters having passbands effectively at said second and third wavelengths, respectively, a first neutral density filter fixed relative to said member in the optical path through each of said fourth and fifth light filters, fourth and fifth circuit means connected from said photomultiplier to sample and hold the output signal thereof during the time that said photomultiplier is illuminated by the passage of light through said fourth and fifth light filters, respectively, and first and second single-pole, double-throw switches each having a pole connected to said third means and a pair of contacts connected from the outputs of said second and fourth, and third and fifth circuit means, respectively, said third means including an amplifier with an adjustable gain to calibrate for full scale when said switches connect said fourth or fifth circuit means to said amplifier.

13. The invention as defined in claim 1, wherein said member includes a rotatable wheel, said filters being angularly spaced therearound, said second means including a substantially constant speed motor, and pulse generating means responsive to the position of said wheel and having an output connected to said circuit means to cause the same to sample sychronously when a corresponding filter passes through the field of view of said photomultiplier.

14. The invention as defined in claim 13, wherein a counter and first, second, third, fourth and fifth gates are connected from said pulse generating means respectively to said first, second, third, fourth and fifth circuit means to cause said first, second, third, fourth and fifth circuit means to sample over mutually exclusive periods of time.

15. The invention as defined in claim 14, wherein said pulse generating means includes a reset pickup to reset said counter once for each revolution of said wheel.

16. A photometric analyzer comprising: a light tight housing, a wheel rotatably mounted relative to and inside of said housing; a motor mounted inside said housing, said motor being adapted to rotate an output shaft thereof at a substantially constant angular velocity; a driving connection between said motor drive shaft and said wheel to rotate said wheel at an approximately constant angular velocity about a predetermined axis; first, second, third, fourth and fifth circular light filters having centers lying on a mathematical circular cylinder concentric with the axis of rotation of said wheel, lines joining immediately adjacent filter centers lying in a single plane forming a pentagon, all the sides of said pentagon being equal in length; first means fixed relative to said housing to shine light through a mixture of gases, and subsequently thereto, to shine light through said filters, in succession, as said wheel is rotated at a substantially constant velocity; said first filter having a passband effectively at a first wavelength where a first predetermined gas has no substantial absorption, said second filter having a passband effectively at a second wavelength where said first gas does have substantial absorption, said third filter having a passband effectively at a third wavelength where a second predetermined gas does have substantial absorption, said second gas having no substantial absorption at said first wavelength, said fourth filter being substantially identical to said second filter, said fifth filter being substantially identical to said third filter; a photomultiplier having a logarithmic output fixed relative to said housing inside thereof to receive, in succession, the light passed by each of said filters; a first neutral density filter fixed relative to said wheel coextensive with said fourth filter to attenuate the light which passes through said fourth filter and which is intercepted by said photomultiplier; a second neutral density filter fixed relative to said wheel coextensive with said fifth filter to attenuate the light that passes through said fifth filter and is intercepted by said photomultiplier; count and reset inductive windings fixed relative to said housing inside thereof contiguous to said wheel, said count winding being located contiguous to the peripheral edge of said wheel, said reset winding being spaced from said count winding; a ferromagnetic slug fixed relative to said wheel at said peripheral edge thereof to pass contiguous to said count winding at each of four locations, each of said locations being approximately on a line normal to said wheel axis midway between each corresponding immediately adjacent pair of filters with the exception that a ferromagnetic slug is fixed relative to the wheel in a position to pass contiguous to said reset winding, and that there is no corresponding slug at the wheel periphery where the slug is located which passes contiguous to said reset winding, said reset winding slug being positioned on a line that extends through the center of said first filter and said wheel axis; a digital pulse counter connected from said count winding to count the voltage pulses induced therein, said counter being connected from said reset winding to reset said counter only when a voltage pulse is induced in said reset winding; first, second, third, fourth and fifth AND gates connected from said counter, said counter having five stable states, each of said AND gates being connected in a manner such that the output of each is a voltage pulse having a width equal to one-fifth of the reset period of said counter, all of the output pulses of said AND gates occurring over mutually exclusive periods of time; first, second, third, fourth and fifth sample and hold circuits having first, second, third, fourth and fifth sampling gates, respectively, first, second, third, fourth and fifth storage capacitors, respectively, and first, second, third, fourth and fifth output amplifiers; first, second, third and fourth adjustable input inverter amplifiers connected from said photomultiplier, said first sample and hold circuit being connected from said photomultiplier, said first, second, third, fourth and fifth sampling gates being connected from the outputs of said photomultiplier and said first, second, third and fourth inverter amplifiers, respectively, to the inputs of said first, second, third, fourth and fifth output amplifiers, respectively, the outputs of said first, second, third, fourth and fifth AND gates being respectively connected to said first, second, third, fourth and fifth sampling gates to turn the same on and off, but not necessarily in that order, said first, second, third, fourth and fifth sampling gates being opened when light intecepted by said photomultiplier passes through said first, second, third, fourth and fifth filters, respectively, said first, second, third, fourth and fifth capacitors being connected from the outputs of said first, second, third, fourth and fifth sampling gates, respectively, to a point of reference potential; first and second single-pole, double-throw switches, each of said switches having a pole and first and second contacts, the outputs of said second and fourth output amplifiers being connected to the first and second contacts of said first switch, respectively, the outputs of said third and fifth output amplifiers being connected to the first and second contacts of said second switch, respectively; first and second voltage indicators; and first and second analog adders, said first adder being connected from the output of said first sample and hold circuit and from the pole of said first switch to said first indicator, said second adder being connected from said first sample and hold circuit and from said second switch pole to said second indicator, each of said adders including an adjustable gain amplifier.

17. The invention as defined in claim 16, wherein said first, second, fourth, third and fifth AND gates produce output pulses in succession in that order to gate on their corresponding respective first, second, fourth, third and fifth sampling gates.

* * * * *